United States Patent [19]
Viricel

[11] Patent Number: 5,343,530
[45] Date of Patent: Aug. 30, 1994

[54] METHOD FOR THE AUTHENTICATION OF DATA

[75] Inventor: Gilles Viricel, Roquevaire, France

[73] Assignee: Gemplus Card International, Gemenos, France

[21] Appl. No.: 936,595

[22] Filed: Aug. 27, 1992

[30] Foreign Application Priority Data

Sep. 3, 1991 [FR] France ............... 91 10886

[51] Int. Cl.$^5$ .............................................. H04K 1/00
[52] U.S. Cl. ........................................ 380/23; 380/25
[58] Field of Search ............... 379/379, 380; 380/3, 380/4, 23, 24, 25, 28, 29, 49, 50

[56] References Cited

FOREIGN PATENT DOCUMENTS 0284133 of 1988 European Pat. Off. .
2616988 of 1988 France .

OTHER PUBLICATIONS

"LSI-based data encryption discourages the data thief", Harvey Hindin, *Electronics* (Jun. 21, 1979) pp. 107–120.

*Primary Examiner*—Tod R. Swann
*Attorney, Agent, or Firm*—Roland Plottel

[57] ABSTRACT

Disclosed is a method of authentication of data elements of the type that may be needed, for example, to authenticate a chip card before permitting a transaction instrument to deliver a service to the holder of this card. Should the authentication consist in ascertaining that an information content is truly present in the card at a determined address of a memory of the card, it is proposed to make the length of the block of information elements parametrizable and to include, in the algorithm for the encryption of this block, data relating to this length; the logic address of the file that contains the block and the position of the block in the file are also used. Furthermore, preferably a recursive algorithm is performed in N steps: the block to be authenticated is sliced into slices of fixed length and, at each step, the Exclusive-OR function of a slice considered and of the result of the preceding step is used as the data to be encrypted. FIG. 1.

9 Claims, 2 Drawing Sheets

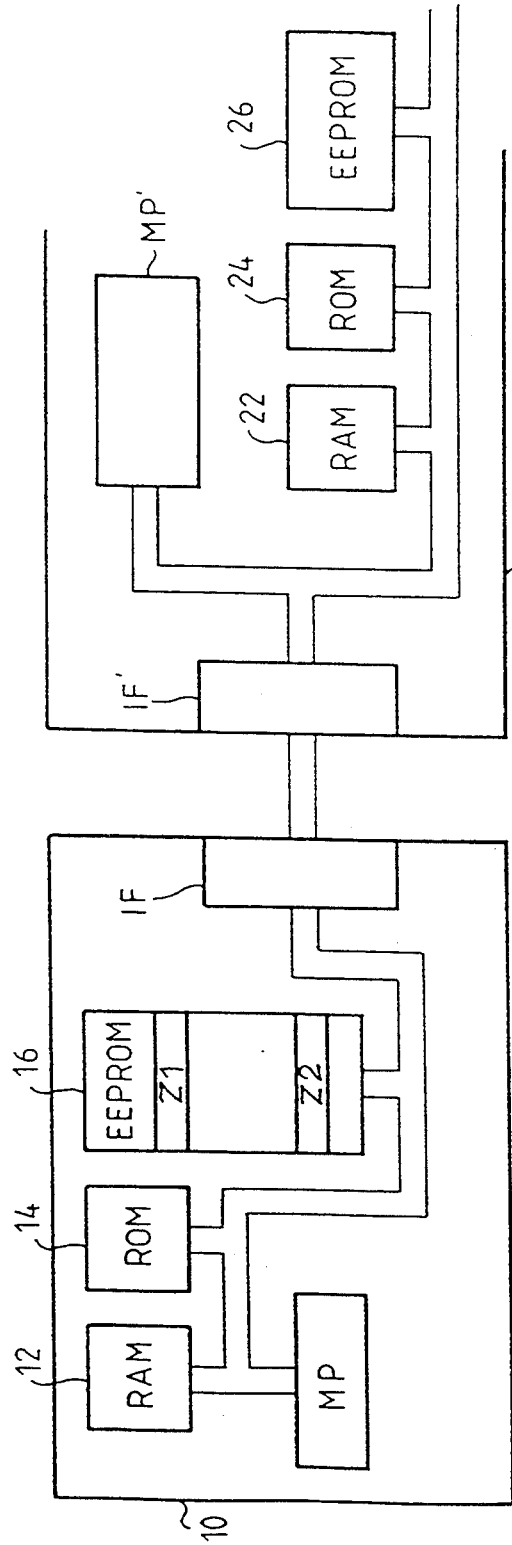
FIG_1
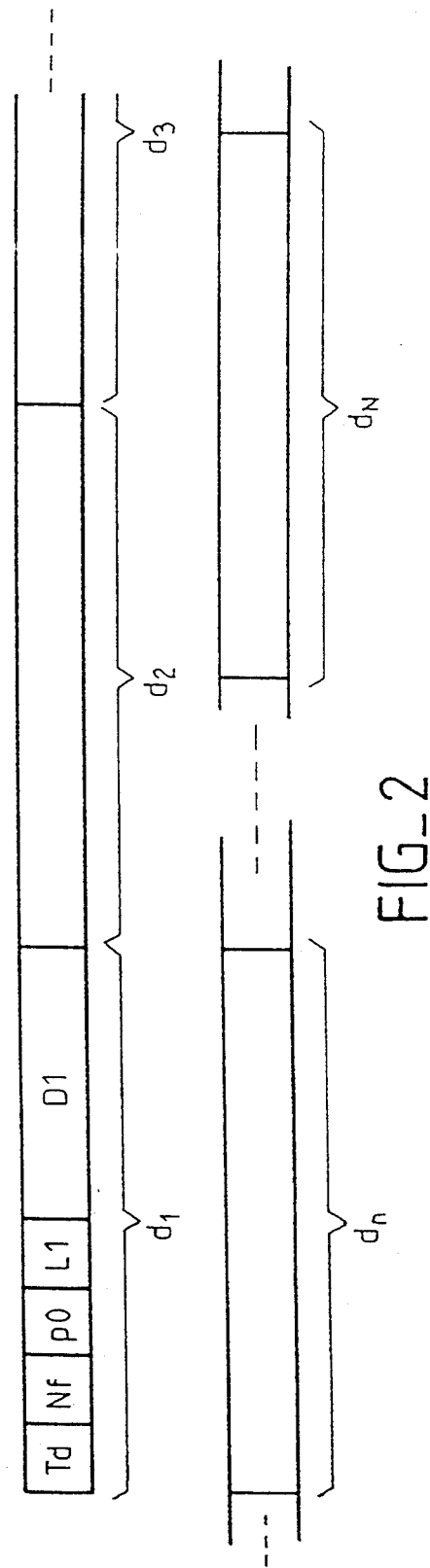
FIG_2

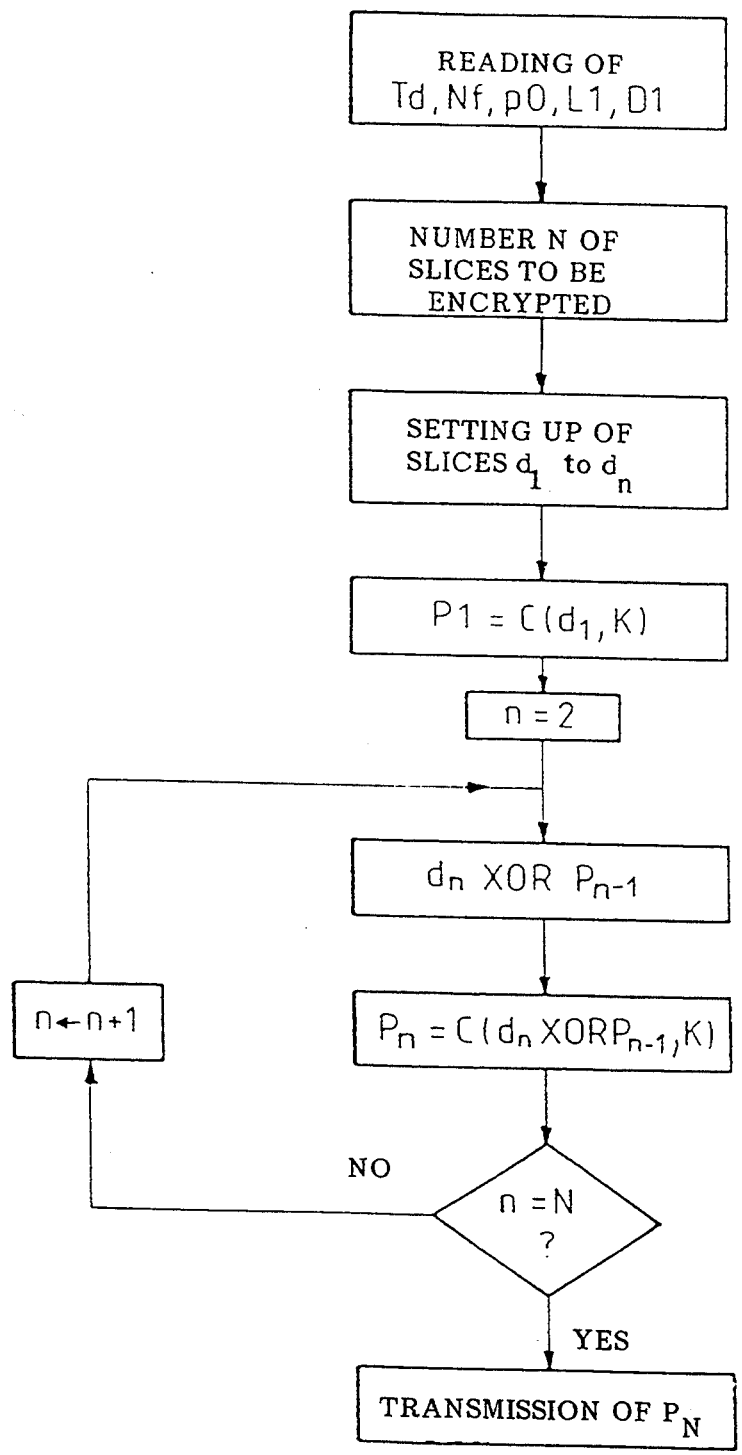
FIG_3

METHOD FOR THE AUTHENTICATION OF DATA

BACKGROUND OF THE INVENTION

1. Field of the Invention

The invention relates to the security of the processing of digitized information elements and, more specifically, it relates to a new method enabling the authentication of binary data elements contained in a file.

The expression "method of authentication" is understood herein as a signal-processing operation by which it is ascertained that a set of data sought at a certain place really is the expected set of data. If this is the case, an authorization is issued (for the execution of other operations). If it is not the case, a prohibition is issued.

Methods of electronic authentication are becoming ever more necessary with the increasing use of electronics in everyday life. Electronic authentication may be used to enable an authorized person to gain access to confidential information or to reserved premises, or to enable transactions directly having a fiduciary value, using a personal account etc.

In particular, electronic chip cards are being increasingly used to provide services. Authentication procedures are necessary to ascertain that the card is truly vested with the power to provide such and such a service and that the holder of the card is truly entitled to use this card. The invention shall be described here below with reference to a chip card so that it can be understood more easily, but the invention is not restricted to this example.

2. Description of the Prior Art

The exemplary methods of authentication that shall be given here below are described as examples to show the variety of possible situations in which the invention, which will be explained thereafter, can be applied.

In the case of a chip card, for example, the following authentication scheme is frequently used: in an internal non-volatile memory, the card contains a confidential code that is specific to the holder of the card and is known to him alone. The card is inserted into a reader that is coupled to a keyboard for the introduction of data elements. The holder of the card introduces his confidential code through the keyboard. This code is transmitted to the card. A comparison is made in the card, and the subsequent operation is permitted only if the code introduced corresponds to the confidential code in memory.

This is a first level of authentication: the verification of the entitlement of the holder.

A second level may consist in ascertaining that the card is truly entitled to carry out the transaction which the reader will carry out with it. The card then contains, in another non-volatile memory zone, a secret key $K_1$ of an encryption algorithm $C(D, K)$ where C is a function of a piece of data D and of a key K. Unlike the personal confidential code which the holder needs to know, the key K is not known to the holder.

The card reader sends any piece of data $D_1$ to the card. The card contains the encryption program $C(D, K)$ in its memory. It encrypts the data $D_1$ by means of the secret key $K_1$, i.e. it performs the function $C(D_1, K_1)$; and it sends the result $R_1$ to the reader which, in the meantime, has encrypted the same data $D_1$ with the same encryption algorithm $C(D,K)$ and with a key $K_2$ which it has in its memory and which should, in principle, correspond to $K_1$. The results $R_1$ and $R_2$ of the encryption operations are compared. If there is correspondence, it means that the right key $K_1$ is present in the chip card. If not, the operation is not authorized. The correspondence may be an identity of $R_1$ and $R_2$, but it may also be a predetermined relationship that is not an identity.

In another method of authentication, given by way of an example, the algorithm $C(D, K)$ used in the card to obtain the result $R_1$ is not the same as that used in the reader to obtain the result $R_2$. For example, the algorithm of the card is an encryption algorithm $C(D_1, K_1)$ leading to a result $R_1$. The algorithm contained in the reader is a decryption algorithm that can be used to recover $D_1$ from $R_1$, referenced $D(R,K)$. It is possible to use a known type of algorithm (RSA) that has the following property: a single key $K_2$, different from $K_1$, is capable of decrypting the result $R_1$ encrypted with the key $K_1$. This means that, for each key $K_1$, a single key $K_2$ is such that if $C(D_1, K_1)=R_1$, then $D(R_1, K_2)=D_1$. The electronic processing is then as follows: the reader sends a piece of data $D_1$ to the card. The card encrypts this data with the algorithm $C(D, K)$, using its internal key $K_1$. It sends the result $R_1$ to the reader. The reader carries out the decryption algorithm $D(R_1, K_2)$ on this result. The result is compared with the data $D_1$ initially sent by the reader. If there is no identity, it means that the key contained in the card was not the right one. In this case, what is verified therefore is not the identity of two encryption keys but the correspondence between an encryption key $K_1$ and the only decryption key $K_2$ that corresponds to it. High security is obtained with this system, especially in the case of the use of the algorithm RSA which is such that the knowledge of the encryption key cannot be used to compute the reverse decryption key and vice versa, so that it is possible for one of the two keys to be unprotected.

To increase the security attached to these methods, the data $D_1$ sent by the reader is a random data element, so that it is not possible to draw conclusions from a succession of fruitless attempts at authentication.

The above paragraphs refer to the authentication of a card by the presence of a secret key that resides in the card. However, it is possible to envisage a case where a part of the contents of the memory of the card has to be authenticated without there being authorization for the contents to travel in clear form on the link between the card and the card reader. In this case, it is possible to envisage, for example, the execution of an encryption algorithm with secret key $C(D,K)$ by using, as a secret key K, a key contained in the card and, as data D, a piece of information contained in the card rather than (or in addition to) a piece of data sent by the card reader.

In this case it is necessary, naturally, for the program that is contained in the card and that carries out the algorithm to know the location of the information to be authenticated. This location is designated either by a physical address or by a logic address in a file.

It has therefore been proposed to authenticate the information by means of an encryption algorithm using, as a key, a secret key contained in the card and, as data, several data elements which are notably the contents of the expected information, the physical or logic address at which it should be located and, as the case may be, the data (for example a random data element) sent by the card reader.

In a practical way, the information elements that are thus certified are data elements of constant length, for example one four-byte word for the information to be certified, one word for the address and one word for the random data element.

SUMMARY OF THE INVENTION

It is an aim of the invention to increase the possibilities of the method of authentication so that one and the same chip card (in the case of chip cards) can be used in a greater number of applications and, consequently, so that one and the same card can contain information elements to be authenticated that are very different in nature.

According to the invention, there is proposed a method of authentication that uses data elements to be authenticated in the form of a block of data elements contained at a determined location of a determined file, and an encryption program that brings into play, as data to be encrypted, the logic address of the file containing the block of data elements, the position and the length of the block of data elements in the file and the actual contents of the block of data elements.

This enables the authentication of the information irrespectively of its size and not just the authentication of information with a size fixed beforehand. Therefore, greater flexibility of use is obtained since it is possible to use one and the same card for very different applications requiring the authentication of blocks of information elements with a size that can be parametrized as a function of the application.

For the encryption programs that use data elements of constant length, the information on the size of the block of data elements to be encrypted is used to split up the information to be encrypted into N slices of constant length; and an encryption operation is carried out for each slice. The encryption program therefore takes account of the size of the block to enable an encryption irrespectively of this size.

In an advantageous mode of implementation of the invention, the encryption program uses an algorithm C (D, K) with a secret key K, which is carried out iteratively in the following way:

the block of information elements to be authenticated is split up into slices of determined size, the nth order slice being designated by $d_n$;

the encryption algorithm C(D, K) is carried out iteratively on data elements which, at a step n, bring into play the slice $d_n$ and the result $P_{n-1}$ of the execution of the algorithm at the previous step n−1.

Preferably, at each step, the encryption algorithm is carried out on a piece of data which is a simple logic combination, preferably an Exclusive-OR combination, of the slice $d_n$ and the result $P_{n-1}$ of the execution of the algorithm at the previous step.

A step of iterative execution of the algorithm will preferably be the execution of the algorithm on a slice of data elements comprising, among other elements, the logic address of the file containing the block as well as the position and the length of the block of data elements.

In practice, it is the first step of the iterative execution of the algorithm that is carried out on the above-mentioned data elements and, as the case may be, on a data element coming from the application (generally, a data element coming from the card reader in the case of a chip card and, preferably, a random data element). It may be noted that, in every case, the logic address of the file, and the position and the length of the block are transmitted to the card in the instruction and are not written in the card.

BRIEF DESCRIPTION OF THE DRAWINGS

Other features and advantages of the invention shall appear from the following detailed description made with reference to the appended drawings, of which:

FIG. 1 shows an example of a system using a memory card containing data elements to be authenticated;

FIG. 2 shows a view, in schematic form, of the splitting up of the block of information elements which will be used for the authentication;

FIG. 3 shows a flow chart of the encryption program enabling the authentication.

MORE DETAILED DESCRIPTION

The invention shall be described with reference to a particular example. This example should not be taken to be an exhaustive one, given the great variety of possible situations as has been shown in the introduction to this patent application.

FIG. 1 shows a memory card 10 comprising essentially a microprocessor MP, memories associated with this microprocessor and the interface circuits IF needed for communication between the card and the exterior.

Among the memories associated with the microprocessor, there are generally a working random-access memory (RAM) 12, a program read-only memory (ROM) 14 and a non-volatile memory (EPROM or EEPROM) 16, electrically programmable and possibly electrically erasable.

The memory 16 is preferably divided into several zones, some of which can be read from the exterior while others cannot be read from the exterior (and can be read only by the microprocessor for its own needs). It may also be divided into programmable and non-programmable zones. When a zone is non-programmable, it means that a recording was done thereon at a given time and that writing access was then permanently blocked by physical or logic means.

The card is designed to communicate with a transaction instrument 20, the purpose of which is to deliver services to the holder of the card when he introduces his card into the instrument. The operation of the instrument, as far as the provision of services is concerned, shall not be described since the invention is limited to aspects relating to the authentication of the card by the instrument. The services, whatever they may be, are delivered only after a successful authentication of the card.

The transaction instrument 20 naturally includes an interface circuit IF', capable of communicating with the corresponding interface circuit of the card 10. The instrument furthermore preferably includes signal processing means similar to those of the card, namely a microprocessor MP', a working random-access memory 22, a program read-only memory 24, possibly a non-volatile memory 26. However, these means may be replaced by a microcomputer or the equivalent thereof, capable of communicating with the card according to a determined protocol (through the interface IF') to exchange information with it.

In the example described herein, it will be assumed that the authentication of the card calls for the verification of the contents of a zone Z1 at a determined location of the non-volatile memory 16 of the card. The transaction apparatus will ascertain that a well-determined block of information elements B1 is present at this location. And, naturally, this ascertaining should be done without making the information elements travel in clear form between the card and the reader.

The memory zone Z1 is taken to be inaccessible, for both reading and writing, from the exterior of the card. However, it is accessible for certain well-determined operations fixed in the programs contained in the read-only memory (ROM) 14 or the EEPROM 16.

The transaction instrument 20 prepares a random data element D1 which it sends to the card. It also sends the logic address of the file and, according to the invention, the size and the position of the block of data elements B1 to be authenticated (this size being evaluated in number of bytes or in number of words for example).

By using an encryption algorithm C(D, K) contained in its program read-only memory, the card will carry out an encryption of the block of information elements and transmit it to the transaction instrument. For it part, the transaction instrument will carry out (in this exemplary embodiment) the same encryption on the same information elements.

For the encryption, the card uses a secret key K which is in a memory zone Z2 that is inaccessible to both reading and writing. Only the microprocessor can access this zone, and can do so only during the execution of the encryption algorithm C(D, K). The memory zone Z2 forms part (in principle) of the non-volatile memory 16.

According to the invention, the data D on which the encryption with a secret key K is done comprises firstly the block of information elements to be authenticated and, secondly, a piece of data representing the size and the position of this block and the logic address of the file containing it. It may also include the random data element D1 transmitted by the reader.

Given that the block of information elements has a size that may be variable, since therein lies one of the most promising features of the invention, it is desirable to use an encryption algorithm that is not hampered by the fact that the size is variable. It is for this reason that the invention uses the size of the block B1, given by the system to the card, to take account of this size in the encryption program.

Standard encryption programs such as the algorithm DES work on data elements of fixed size and give results of fixed size.

To enable the encryption with this type of algorithm, preferably there is provision for splitting up the block of data elements to be authenticated into slices of fixed size and for carrying out an encryption operation in several steps, sufficient in number to process all the slices.

According to a particular feature of the invention, it is proposed, at each step, to carry out an encryption operation not on each slice of the block to be authenticated but on a simple logic combination of a determined slice and of the result of the operation carried out in the preceding step. The logic combination is preferably an Exclusive-OR combination.

In other words, the card splits up the block of data elements to be authenticated into N slices having a fixed size, the contents of which are $d_n$ for the nth slice. The encryption algorithm C(D, K), carried out at the step n, gives a result $P_n$.

In this case, the following computation is done at each step:

$$P_n = C(d_n \text{ Xor } P_{n-1}, K)$$

where the expression ($d_n$ Xor $P_{n-1}$) represents the Exclusive-OR combination of $d_n$ and $P_{n-1}$.

Naturally, at the first step, n is equal to 1 and there is no preceding result $P_{n-1}$. The computation can be done directly on the first slice of data elements $d_1$. Then:

$$P_1 = C(d_1, K)$$

Preferably, the first slice of data elements will include the logic characteristics enabling the identification of the position and the size of the file as well as the logic address of the file and, if necessary, the random number D1 given by the application. These characteristics therefore comprise the following series of indications:

Rd: type of the directory in which there is the file of data containing the block B1; for example one byte;

Nf: number of the file in this directory; for example one byte;

p0: position of the block of information elements B1 in relation to the beginning of the file; for example one byte;

L1: length of the block B1; for example one byte;

D1: random data element given by the transaction instrument; for example four bytes.

The first slice therefore comprises, for example, eight bytes:

$$d_1 = Td, Nf, p0, L1, D1.$$

The other slices will be the succession portions of eight bytes of the block of information elements B1.

The Exclusive-OR operation preserves the length of the slices of the slicing operation.

Since the usual encryption algorithms (DES, RSA) give results that have the same size as the encrypted data elements, the sequence of iterative steps relates, each time, to data elements of the same length.

In the example described more specifically herein, the algorithm used for C(D, K) will be the algorithm DES published by the National Bureau of Standards of the United States of America. A detailed description thereof may be obtained from this organization or in the *Federal Register*, Vol. 40, No. 52 (Mar. 17, 1975) and Vol. 40, No. 149 (Aug. 1, 1975).

In brief, the encryption program contained in the read-only memory 14 of the card will cause the microprocessor first of all to slice the block of information elements to be encrypted (block B1 + information elements on address, position and size + random data element D1) into N slices, and then the microprocessor will do the actual iterative encryption, in taking account of the previously evaluated number of slices.

The final result $P_N$ of the succession of recursive steps described further above is transmitted to the transaction instrument. The same computation is carried out by this instrument and the results are compared for the authentication of the card.

The flow chart of FIG. 3 gives a schematic view of the essential steps of the authentication program contained in the read-only memory 14 of the card and carried out by the microprocessor MP as soon as the instrument 20 has transmitted the necessary information elements.

A description has thus been given of an original solution enabling the use of a variable block length to authenticate an element such as a memory card. The solution prevents authentication if the information block does not have the expected logic characteristics (relating to the position, size and logic address of the file) and the expected contents.

What is claimed is:

1. A method of encryption that uses data elements to be authenticated in the form of a block of data elements contained at a determined location of a determined file of a memory, and an encryption program that brings into play, as data to be encrypted, logic address of the file, position and length of the block, as well as the contents of the block said length being variable.

2. A method according to claim 1, wherein the encryption program sets up a slicing, into N slices, of the set of information elements comprising, firstly, the block of data elements to be authenticated and, secondly, other information elements such as said length of the block and its position, then it carries out an encryption program taking into account the number N of slices.

3. A method according to one of the claims 1 or 2, wherein the encryption program uses an algorithm C(D, K) with a secret key K, which is carried out iteratively in the following way:

the block of information elements to be authenticated is split up into slices of determined size, the nth order slice being designated by $d_n$;

the encryption algorithm C(D, K) is carried out iteratively on data elements which, at a step n, bring into play the slice $d_n$ and the result $P_{n-1}$ of the execution of the algorithm at the previous step n−1.

4. A method according to claim 3 wherein, at each step, the encryption algorithm is carried out on a piece of data which is a simple logic combination, preferable an Exclusive-OR combination, of the slice $d_n$ and of the result $P_{n-1}$ of the execution of the algorithm at the previous step.

5. A method according to claim 3, wherein a step of iterative execution is the execution of the algorithm on a piece of data comprising, among other elements, the length of the block of data elements to be authenticated.

6. A method according to claim 5 wherein, at the first step, the encryption algorithm is carried out by using, as data D to be encrypted by the secret key K, the logic characteristics of position and length of the block of information elements as well as the logic address of the file and, possibly, a random number.

7. A method according to any of the above claims 1 or 2, wherein the data elements to be authenticated are contained in the memory of a memory card, wherein the encryption algorithm is performed by a microprocessor contained in the card under the control of a program contained in a memory of the card, and wherein the result of the encryption is transmitted to the exterior of the card.

8. A method according to claim 6, wherein the encryption algorithm uses a secret key that is contained in a memory of the card and has a content which cannot be transmitted to the exterior of the card.

9. A method of encryption of a block of data located at a predetermined location, in a predetermined file of memory, encrypting said block of data with additional data namely with an address of the predetermined location of said block of data, an address of said file, and length of said block of data.

* * * * *